(12) United States Patent
Wong et al.

(10) Patent No.: US 9,553,948 B2
(45) Date of Patent: Jan. 24, 2017

(54) USER INTERFACE FOR MANAGING MONITORING PROFILES

(75) Inventors: Karen Natalie Wong, San Carlos, CA (US); Martin Bednar, San Carlos, CA (US)

(73) Assignee: VMware, Inc., Palo ALto, CA (US)

( * ) Notice: Subject to any disclaimer, the term of this patent is extended or adjusted under 35 U.S.C. 154(b) by 748 days.

(21) Appl. No.: 13/101,948

(22) Filed: May 5, 2011

(65) Prior Publication Data
US 2012/0284628 A1 Nov. 8, 2012

(51) Int. Cl.
| | |
|---|---|
| H04L 29/08 | (2006.01) |
| H04L 12/26 | (2006.01) |
| H04L 12/24 | (2006.01) |
| G06F 11/30 | (2006.01) |
| G06F 11/07 | (2006.01) |
| G06F 11/32 | (2006.01) |

(52) U.S. Cl.
CPC ........... *H04L 67/306* (2013.01); *G06F 11/076* (2013.01); *G06F 11/0709* (2013.01); *G06F 11/301* (2013.01); *G06F 11/3055* (2013.01); *G06F 11/3072* (2013.01); *H04L 41/22* (2013.01); *H04L 41/5096* (2013.01); *H04L 43/0817* (2013.01); *G06F 11/32* (2013.01); *H04L 41/0213* (2013.01)

(58) Field of Classification Search
CPC ...... H04L 41/12; H04L 41/22; H04L 12/2602; H04L 43/00; H04L 43/045; G06F 3/0662–3/0667; G06F 9/5077; G06F 9/45533–9/45558; G06F 2009/45562–2009/45595; G06F 3/048–3/04897; G06F 11/0709; G06F 11/301; G06F 11/3055

USPC ......................................................... 715/736
See application file for complete search history.

(56) References Cited

U.S. PATENT DOCUMENTS

| | | | | |
|---|---|---|---|---|
| 5,136,690 | A * | 8/1992 | Becker et al. | 715/853 |
| 6,535,227 | B1 * | 3/2003 | Fox et al. | 715/736 |
| 6,901,582 | B1 * | 5/2005 | Harrison | 717/127 |
| 7,299,472 | B2 * | 11/2007 | de Bonet et al. | 719/310 |
| 7,383,327 | B1 * | 6/2008 | Tormasov et al. | 709/220 |
| 7,512,888 | B2 * | 3/2009 | Sugino et al. | 715/734 |
| 7,698,706 | B2 * | 4/2010 | Bantz et al. | 718/1 |

(Continued)

OTHER PUBLICATIONS

Cisco Systems, Inc.. 2008. "Cisco Adaptive wIPS Deployment Guide".*

(Continued)

*Primary Examiner* — Jennifer To
*Assistant Examiner* — Liang Li

(57) ABSTRACT

A graphical user interface for a virtualized computing environment that includes a plurality of host computers, each having one or more virtual machines running therein, where the virtualized computing environment is configured with one or more monitoring profiles for monitoring a status of objects included in the virtualized computing environment, where the graphical user interface includes a first section and a second section. The first section organizes the one or more monitoring profiles, where each monitoring profile includes one or more rules and each rule corresponds to an action that is performed if the rule is violated. The second section organizes a first set of rules associated with a selected monitoring profile and corresponding actions associated with each rule in the first set of rules.

20 Claims, 17 Drawing Sheets

(56) References Cited

U.S. PATENT DOCUMENTS

| | | | | |
|---|---|---|---|---|
| 7,711,822 B1* | 5/2010 | Duvur et al. | | 709/226 |
| 7,725,416 B2* | 5/2010 | Buss | | 706/47 |
| 7,844,666 B2* | 11/2010 | Horvitz et al. | | 709/206 |
| 7,853,880 B2* | 12/2010 | Porter | | 715/734 |
| 7,861,244 B2* | 12/2010 | Vasile | | 718/1 |
| 7,941,510 B1* | 5/2011 | Tormasov et al. | | 709/220 |
| 7,979,245 B1* | 7/2011 | Bourlatchkov et al. | | 703/2 |
| 8,001,527 B1* | 8/2011 | Qureshi et al. | | 717/120 |
| 8,141,075 B1* | 3/2012 | Chawla et al. | | 718/1 |
| 8,175,863 B1* | 5/2012 | Ostermeyer et al. | | 703/22 |
| 8,255,484 B2* | 8/2012 | Khandekar et al. | | 709/217 |
| 8,806,486 B2* | 8/2014 | Martin | G06F 9/45533 | 709/231 |
| 2006/0129569 A1* | 6/2006 | Dieberger et al. | | 707/100 |
| 2007/0113288 A1* | 5/2007 | Blumenau | | 726/26 |
| 2010/0251252 A1* | 9/2010 | Laverone et al. | | 718/104 |
| 2011/0161851 A1* | 6/2011 | Barber et al. | | 715/769 |
| 2011/0178962 A1* | 7/2011 | Sood | | 706/11 |
| 2012/0110514 A1* | 5/2012 | Trowbridge | G06F 9/5077 | 715/853 |
| 2013/0077491 A1* | 3/2013 | Cherian et al. | | 370/235 |

OTHER PUBLICATIONS

Lowe, Scott. Mastering VMware VSphere 4. Indianapolis: Wiley Pub., 2009. Print.*

* cited by examiner

FIG. 3C

▼ Monitor Profiles

| Profile Type: | This object (VM) ▶ | | |
|---|---|---|---|
| Primary Assigned | Silver VM | Assign... Remove | Edit as local profile |
| Description | For VMs in production | | |
| Inherited Profiles | ▶ 4 monitor profiles | | |

| Inheritance Hierarchy | Applied Profile | Priority |
|---|---|---|
| 🖳 VC01 ～416 | Standard VM ～418 | 4 |
| ⊟🏢 Datacenter 03 | | |
| ⊟📁 Sub folder | | |
| ⊟🖥 Host 23 ～412 | VMs on Host23 ～414 | 3 |
| ⊟📁 Production ～408 | Production VM ～410 | 2 |
| ⊟📁 Project X | | |
| 🖥 Windows_XP | Silver VM | 1 |

▼ Monitor Profiles

| Profile Type: | This object (VM) ▶ | | | |
|---|---|---|---|---|
| Primary Assigned | Silver VM — 508 | | Assign... Remove | Edit as local profile |
| Description | For VMs in production | | | |
| Inherited Profiles | ▲ 4 monitor Profiles — 506 | | | |

504

Effective Monitor Profile

☐ Edit as local profile

View Activities:  Health | Non-health                                Filter: Text

| Rule | Description | Defined In | Include | Actions |
|---|---|---|---|---|
| ▶ Health (Worst of) | | <Varied> | | |
| ▲ Storage Capacity (Best of) | | Silver VM | Yes | 0 |
| ▼ Memory (Worst of) | | Standard VM | Yes | 2 |
| Memory Connection | | Standard VM | | 2 |
| Demand | | Standard VM | | 1 |
| Entitlement | | Standard VM | | 1 |
| Guest memory contention | | Silver VM | No | -0- |
| ▲ ~~CPU capacity~~ | | | | |

512    514

[ New Rule... | ▼ ]  [ Edit... ]  [ Remove ]

510

Details:

State Changes | Actions

20 Mbps ——△—— ◇ —— 40 Mbps

| State | Health Thresholds |
|---|---|
| ● Critical | If > 30 Mbps for the last 3 days |
| ○ Warning | If > 50 Mbps for the last 3 days |
| ● Normal | If anything else |

[ Reset All ]  [ Edit... ]

☐ Alert

Note: It is recommended that alerting be set at the root health level only

Health & Actions | Stats Collected

▽ Health and Action profiles

Add Custom Rule

[Rule Name & Type] [Select Condition] [Condition Details] [Actions]

☑ Raise Alerts

| Actions | | G->Y | Y->R | R->Y | Y->G |
|---|---|---|---|---|---|
| Send e-mail to Sam | X | | Once ▼ | | |
| Add... | | | | | |

[Previous] [Next] [Finish]

FIG. 7E

Health and Action Profiles

| Primary Profile | Silver VM (default) | Edit... | Save As... | Remove |
|---|---|---|---|---|
| Object Type: | Virtual Machine | | | |
| Description | For VMs in production | | | |
| Inheritance: | ☑ Inherit Health & Action profiles (4) | | View... | |

Effective Profile

☐ Override Profile

Show: Health | Other

Filter: [Text]

| Rule | Alert | Defined In |
|---|---|---|
| Rule | | Defined In |
| Login failure > 3 times within 10 minutes | ☑ | Silver VM |
| Memory Contention Custom Rule | ☑ | Silver VM |
| Host hardware failure | ☐ | Standard VM |
| Critical state of any VM in the Production folder | ☐ | Standard VM |

[New Rule...] [Remove]

Details:

| Condition | | Edit... |
|---|---|---|
| Thresholds | | State |
| > 30 for the last 3 hours | | ● |
| > 30 for the last 3 hours | | ○ |
| Else | | ● |

| Actions | |
|---|---|
| ☑ Raise Alerts | |
| Send e-mail to Sam | |

[Add Action] [Remove]

[Group] [Ungroup]

FIG. 7G

USER INTERFACE FOR MANAGING MONITORING PROFILES

BACKGROUND

Computer virtualization is a technique that involves encapsulating a physical computing machine platform into a virtual machine that is executed under the control of virtualization software running on a single hardware computing platform (also referred to herein as "host system" or "host computer"). A group of hardware computing platforms may be organized as a cluster to provide the hardware resources for virtual machines. In a data center that employs virtual machines, it is common to see hundreds, even thousands, of virtual machines running on multiple clusters of host systems.

A virtualization management software is used by an administrator to manage the configuration of the virtual machines and the allocation of computing resources to the virtual machines. Because of the large number of virtual machines to be managed within a single data center, and sometimes, across multiple data centers, some of the administrator's tasks are automated. For example, software automated techniques such as dynamic resource scheduling and dynamic power management have been developed to assist the administrator in balancing workloads across host systems and powering host systems ON and OFF as needed.

One feature of the virtualized computing environment that is controlled by the virtualization management software is monitoring the status, or "health," of objects included in the virtualized computing environment. Conventional techniques for monitoring the status of objects include setting alarms. An alarm is triggered when a particular metric associated with the object exceeds a predefined threshold. For example, a virtual machine may be associated with an alarm that is triggered when the CPU (central processing unit) usage of the virtual machine exceeds 80%. A user, such as an administrator, that interacts with the virtualization management software is notified that the alarm has been triggered and can perform some action to remedy the situation.

One problem with conventional monitoring techniques involving alarms is that a separate alarm definition is typically required for each object. As a result, each virtual machine in the virtualized computing environment could be associated with a separate alarm having the same alarm definition. If the administrator desires to modify the alarm for multiple virtual machines, then the administrator would need to manually adjust the parameters of each individual alarm. When a large number of virtual machines is included in the virtual computing environment, managing the various alarms can become time consuming and error prone for the administrator. Additionally, when the virtual computing environment is organized as a hierarchy, conflicts can be created when alarm parameters applied to one object in a hierarchy conflict with alarm parameters of a parent object in the hierarchy.

Accordingly, there remains a need in the art for a user interface for managing a virtualized computing environment that addresses the drawbacks and limitations discussed above.

SUMMARY

One or more embodiments of the invention provide for a monitoring profile that includes a collection of rules with expected values of performance or activity defined for an object in a virtualized computing environment. The rules can be associated with actions, alerts, or other operations that are performed if the rules are violated. The monitoring profile can be associated with one or more objects in the virtualized computing environment. Additionally, rules can be inherited from monitoring profiles of other objects in a hierarchy, and prioritization rules disambiguate between conflicts. A user can modify the rules or actions associated with a monitoring profile. By providing these features, a user interface according to one or more embodiments of the present invention allows the user to quickly and easily monitor the status of objects in the virtual computing environment. For example, the user only needs to change the monitoring profile a single time, and any objects in the virtualized computing environment to which the monitoring profile is applied are updated to be associated with the modified monitoring profile.

One embodiment of the invention provides a graphical user interface for a virtualized computing environment that includes a plurality of host computers, each having one or more virtual machines running therein, where the virtualized computing environment is configured with one or more monitoring profiles for monitoring a status of objects included in the virtualized computing environment, where the graphical user interface includes a first section and a second section. The first section organizes the one or more monitoring profiles, where each monitoring profile includes one or more rules and each rule corresponds to an action that is performed if the rule is violated. The second section organizes a first set of rules associated with a selected monitoring profile and corresponding actions associated with each rule in the first set of rules.

BRIEF DESCRIPTION OF THE DRAWINGS

FIG. 3C depicts a screenshot of an applied objects portion of a user interface for managing a monitoring profile, according to one embodiment of the invention.

FIG. 4 depicts a screenshot of an inheritance hierarchy for monitoring profiles applied to objects in a virtualized computing environment, according to one embodiment of the invention.

FIG. 5B depicts a details portion 504 of the effective profile, according to one embodiment of the invention.

FIGS. 7A-7G depict screenshots of user interfaces for defining a monitoring profile, according to embodiments of the invention.

DETAILED DESCRIPTION

Figure 1A:
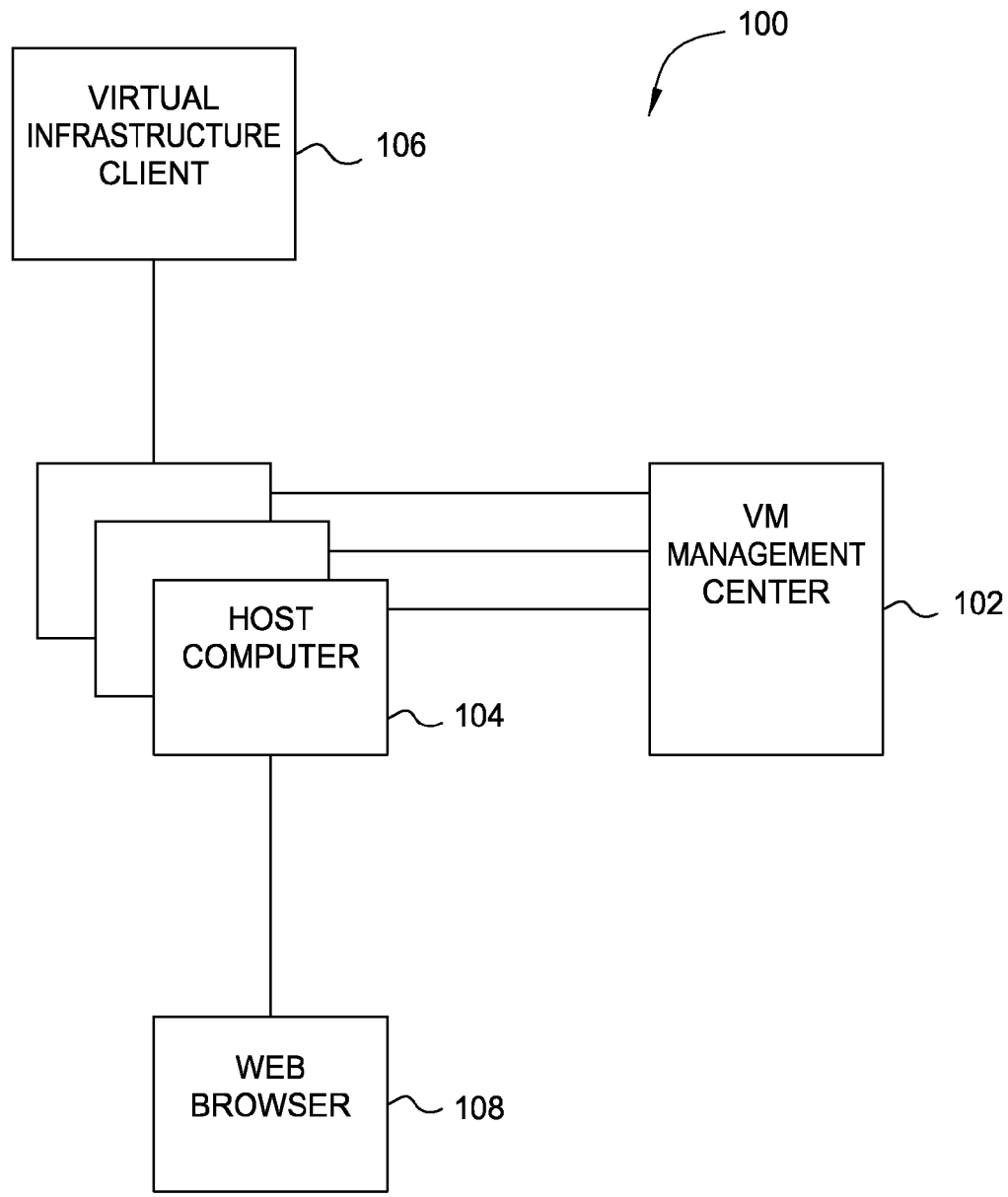
FIG. 1A depicts a block diagram of a virtualized computer system in which one or more embodiments of the present invention may be practiced.

FIG. 1A depicts a block diagram of a virtualized computer system 100 in which one or more embodiments of the present invention may be practiced. Host computers 104 (also referred to herein as "servers") are configured to deliver virtualization-based distributed services to information technology environments. Each host computer 104 provides a virtualization layer that abstracts processor, memory, storage, and/or networking resources into multiple virtual machines that run side-by-side on the same physical host computer 104. In one embodiment, virtualization software can be installed directly on the server hardware and inserts a virtualization layer between the hardware and the operating system. The virtualization software partitions a physical host computer 104 into multiple secure and portable virtual machines that run on the same physical server. Each virtual machine represents a complete system—with processors, memory, networking, storage, and/or BIOS.

A virtual machine (VM) management center 102 is also included in the system 100. The VM management center 102 manages the virtual infrastructure, including managing the host computers 104, the virtual machines running within each host computer 104, provisioning, migration, resource allocations, and so on.

According to various embodiments, implementing a virtualized system simplifies management with a management application, such as the Virtual Infrastructure (VI) Client 106, that can be used to perform tasks. Each server configuration task, such as configuring storage and network connections or managing the service console, can be accomplished centrally through the VI Client 106. One embodiment provides a stand-alone application version of the VI Client 106. In another embodiment, a web browser application 108 provides virtual machine management access from any networked device. For example, with the browser version of the client 108, giving a user access to a virtual machine can be as simple as providing a URL (Uniform Resource Locator) to the user.

According to some embodiments, user access controls of the VM management center 102 provide customizable roles and permissions so an administrator can create roles for various users by selecting from an extensive list of permissions to grant to each role. Responsibilities for specific virtualized infrastructure components, such as resource pools, can be delegated based on business organization or ownership. VM management center 102 can also provide full audit tracking to provide a detailed record of every action and operation performed on the virtual infrastructure. As described in greater detail herein, embodiments of the invention provide a user interface for the VI Client 106 that allows a user to manage a distributed virtual switch (DVS).

Figure 1B:
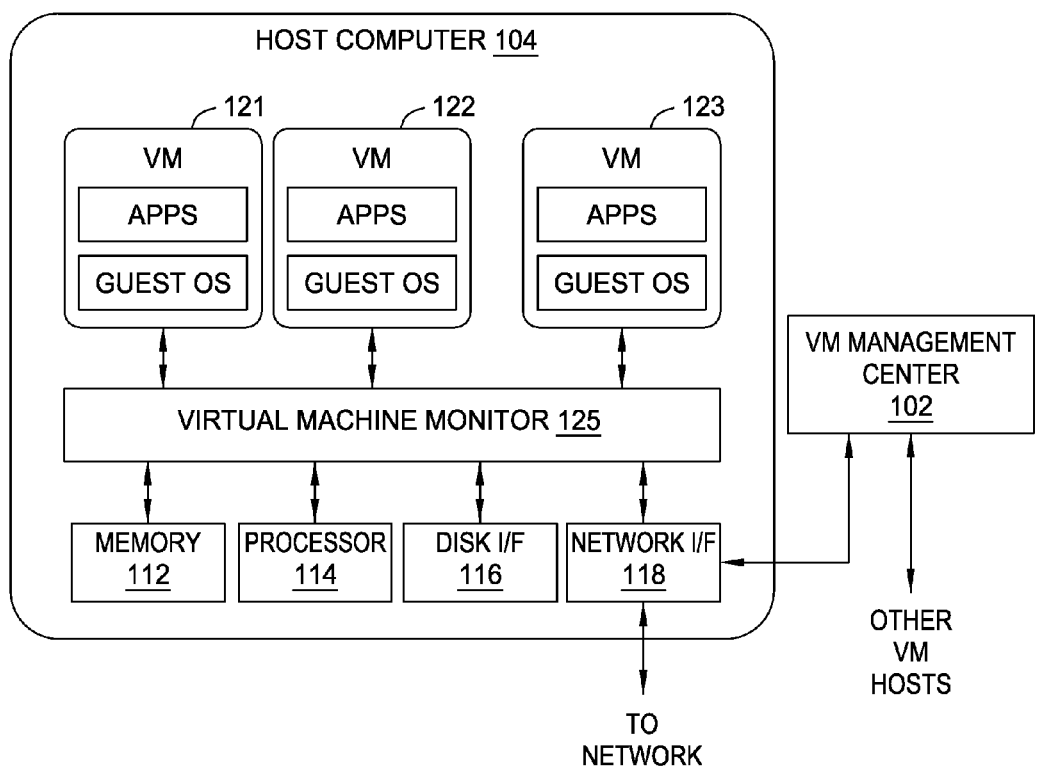
FIG. 1B depicts a block diagram of a host computer and virtual machine (VM) management center, according to one embodiment of the invention.

FIG. 1B depicts a block diagram of a host computer 104 and VM management center 102, according to one embodiment of the invention. A virtualized environment includes a host computer 104 that has conventional components of a computing device, and may be implemented within a cluster of computing devices. One or more virtual machines are configured within the host computer 104, represented in FIG. 1B as VM 121, VM 122, and VM 123, which share hardware resources of host computer 104, such as system memory 112, processor 114, disk interface 116, and network interface 118. Examples of disk interface 116 are a host bus adapter and a network file system interface. An example of network interface 118 is a network adapter, also referred to as a Network Interface Card (NIC). In some embodiments, a plurality of NICs is included in the network interface 118.

The virtual machines VM 121-123 run on top of a virtual machine monitor 125, which is a software interface layer that enables sharing of the hardware resources of host computer 104 by the virtual machines. Virtual machine monitor 125 may run on top of the operating system of the host computer 104 or directly on hardware components of the host computer 104. In some embodiments, virtual machine monitor 125 runs on top of a hypervisor that is installed on top of the hardware resources of host computer 104. Together, the virtual machines 121-123 and virtual machine monitor 125 create virtualized computer systems that give the appearance of being distinct from host computer 104 and from each other. Each virtual machine includes a guest operating system and one or more guest applications. The guest operating system is a master control program of the virtual machine and, among other things, the guest operating system forms a software platform on top of which the guest applications run.

In one embodiment, data storage for host computer 104 is served by a storage area network (SAN) (not shown), which includes a storage array (e.g., a disk array) and a switch (SAN fabric) that connects host computer 104 to storage array 160 via the disk interface 116. In virtualized computer systems, in which disk images of virtual machines are stored in the storage arrays, disk images of virtual machines can be migrated between storage arrays as a way to balance the loads across the storage arrays. For example, the Storage VMotion™ product that is available from VMware Inc. of Palo Alto, Calif. allows disk images of virtual machines to be migrated between storage arrays without interrupting the virtual machine whose disk image is being migrated or any applications running inside it. In other embodiments, any technically feasible data storage implementation, other than a SAN, can be used to provide storage resources for host computer 104.

Figure 2:
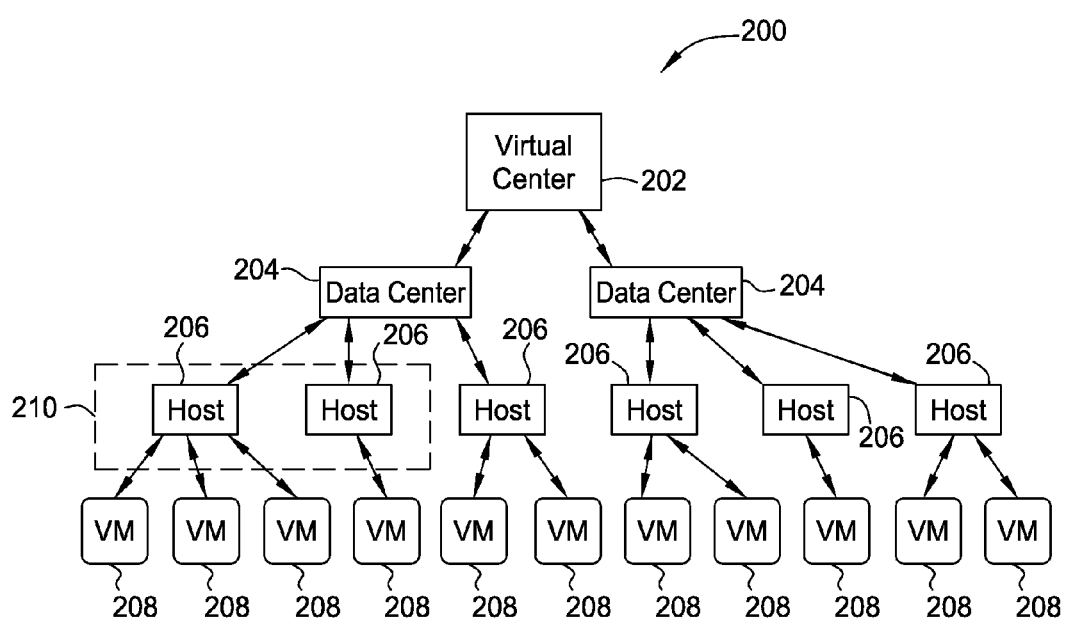
FIG. 2 depicts a hierarchical organization of a virtualized computing environment, according to one embodiment of the invention.

FIG. 2 depicts a hierarchical organization of a virtualized computing environment 200, according to one embodiment of the invention. As shown, a virtual center 202 is at the root of the hierarchy. The virtual center 202 includes one or more data centers 204. Each data center 204 includes one or more host computers 206. A set of host computers 206 can also be organized as a cluster 210. Each host computer 206 can run one or more virtual machines (VMs). As described in greater detail herein, one or more monitoring profiles can be defined for the virtual computing environment 200. The monitoring profiles can be applied to one or more objects in the virtualized computing environment 200 (i.e., applied to the virtual center 202, data centers 204, host computers 206, and/or virtual machines 208) to monitor the status of the objects in the virtualized computing environment 200.

Figure 3A:
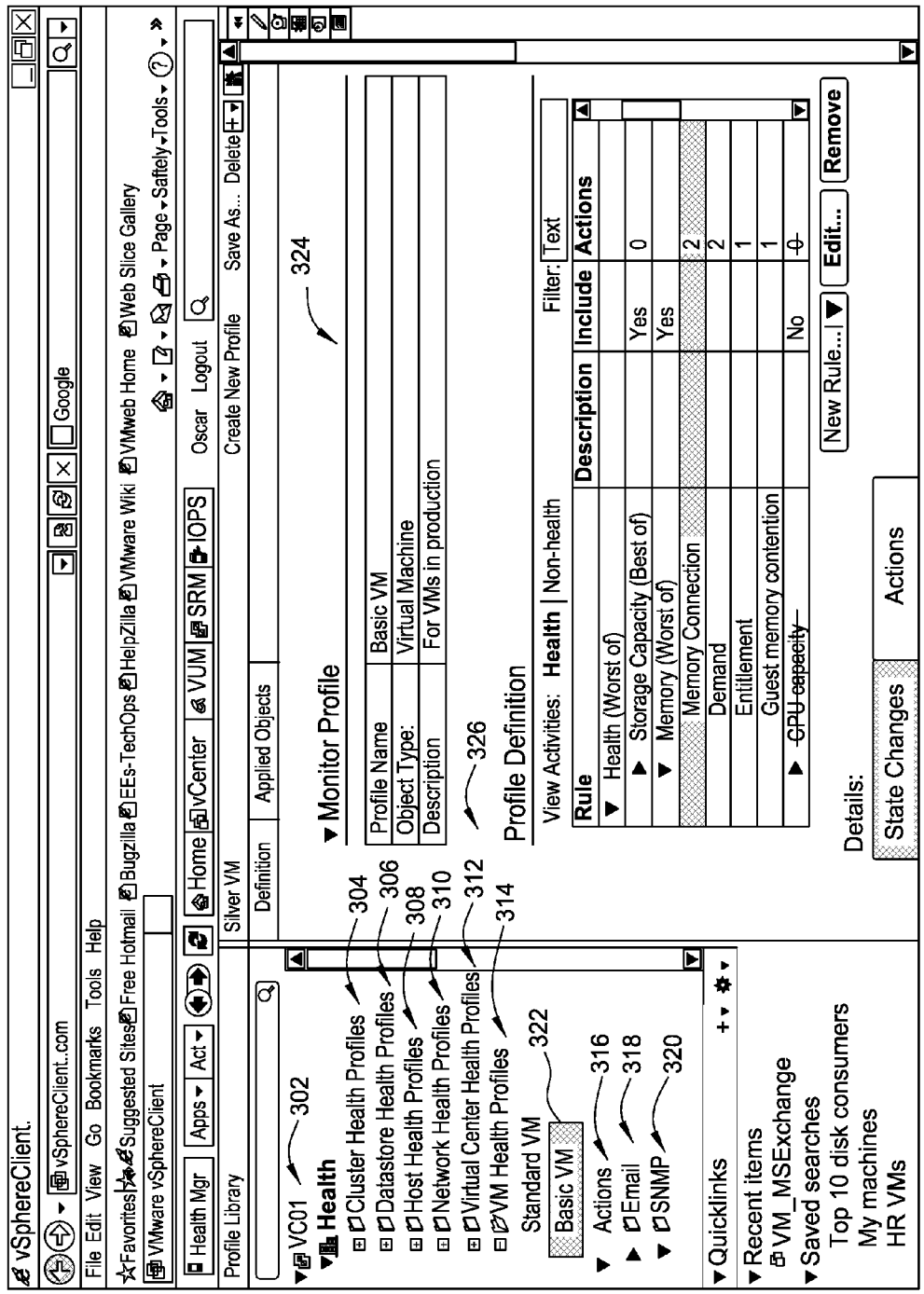
FIG. 3A depicts a screenshot of a user interface for managing one or more monitoring profiles, according to one embodiment of the invention.

FIG. 3A depicts a screenshot of a user interface for managing one or more monitoring profiles, according to one embodiment of the invention. As shown, the user interface includes a profile library portion 302. The profile library portion 302 includes a hierarchically-arranged view of the one or more monitoring profiles. The monitoring profiles can be organized into folders for cluster health profiles 304, data center health profiles 306, host computer health profiles 308, network health profiles 310, virtual center health profiles 312, and/or virtual machine health profiles 314. The organization of folders shown in FIG. 3A is merely exemplary, and any other organizational structure for organizing one or more monitoring profiles, including non-object type specific monitoring profiles, is also within the scope of embodiments of the invention.

In one embodiment, a monitoring profile includes a collection of rules with expected values of performance or activity defined for an object in the virtualized computing environment. The rules can be associated with actions, alerts, or other operations that are performed if the rules are violated. In one embodiment, monitoring profiles are object-type specific, as shown in FIG. 3A by the arrangement of the folders by object-type. In another embodiment, monitoring profiles are not object-type specific and can be applied to any type of object in the hierarchy of a virtualized computing environment. In one example, suppose the virtualized computing environment includes a VM-specific monitoring profile X and another VM-specific monitoring profile Y. Suppose that monitoring profile X is applied to VM1, and monitoring profile Y is applied to the VM1's parent host. In one example, monitoring profile Y does not affect the host object's monitoring status since the monitoring profile Y is VM-specific. However, monitoring profile Y can be inherited by each VM under VM1's parent host.

Also included in the user interface is an action library portion 316. The action library portion 316 includes a view of one or more actions that can be performed when a rule associated with a monitoring profile is violated. Examples of actions to be performed include sending an email 318, issuing an SNMP (Simple Network Management Protocol) trap 320, executing a script, performing a virtual architecture-specific action, such as migrating a virtual machine from one host to another or migrating a disk image of a virtual machine from one storage array to another, or performing any other action. Accordingly, providing such a "library" of actions allows users to assign things, such as email addresses to use when sending alert emails, in one central location and not have to redefine then throughout the virtual environment.

A user can select one of the monitoring profiles or action profiles shown in the user interface to view or edit the monitoring profile or action profile. As shown, the user has selected a "Basic VM" monitoring profile 322. When a monitoring profile is selected from the profile library portion 302, details of the monitoring profile can be displayed in a details portion 324.

Figure 3B:
FIG. 3B depicts a screenshot of a details portion of a user interface for managing one or more monitoring profiles, according to one embodiment of the invention.

FIG. 3B depicts a screenshot of a details portion 324 of a user interface for managing one or more monitoring profiles, according to one embodiment of the invention. As shown, the details portion 324 includes a monitor profile portion 326, a profile definition portion 328, and a parameter details portion 330.

The monitor profile portion 326 includes basic identifying information about the monitoring profile, such as a name for the monitoring profile, an object-type to which the profile can be applied, and a brief description of the monitoring profile.

The profile definition portion 328 includes a listing of rules that are included in the monitoring profile. The rules can be organized based on the type of virtual resource being monitored. For example, the rules can be organized by storage resources, memory resources, CPU resources, network resources, or any other type of resources. In some embodiments, the rules in the profile definition portion 328 can include non-status, or "non-health," rules. An example of a non-health rule is monitoring for whether a user has attempted to log-on to a virtual machine with incorrect log-on credentials more than a threshold number of times, e.g., more than three times.

The parameter details portion 330 includes the threshold values of the various rules included in the monitoring profile definition that trigger actions to be performed. In some embodiments, actions can be triggered based on metrics and/or events. The parameter details portion 330 also includes associated actions that are performed when the threshold are exceeded. As described above, the actions to be performed can be selected from an action library of available actions. In the example shown in FIG. 3B, a slider is displayed in the parameter details portion 330. The slider includes a critical handle and a warning handle to indicate the threshold ranges. In one embodiment, the user can specify specific details for the handles in the state and/or threshold rules below the slider. In some embodiments, the user can adjust one or more of the sliders, which causes the combination of setting values to change based on a predetermined formula. For example, some users not know or understand the advised and/or expected combinations of values (i.e., metric value, threshold period, percentage of time, etc.), so the parameter settings can be set automatically by the user moving the slider. Also, in some embodiments, the thresholds can be set using a double slider, instead of a separate high and low sliders for each stage (e.g., critical, warning, ok). In this manner, the user does not have to ensure that the ranges give a complete range.

Figure 3C:
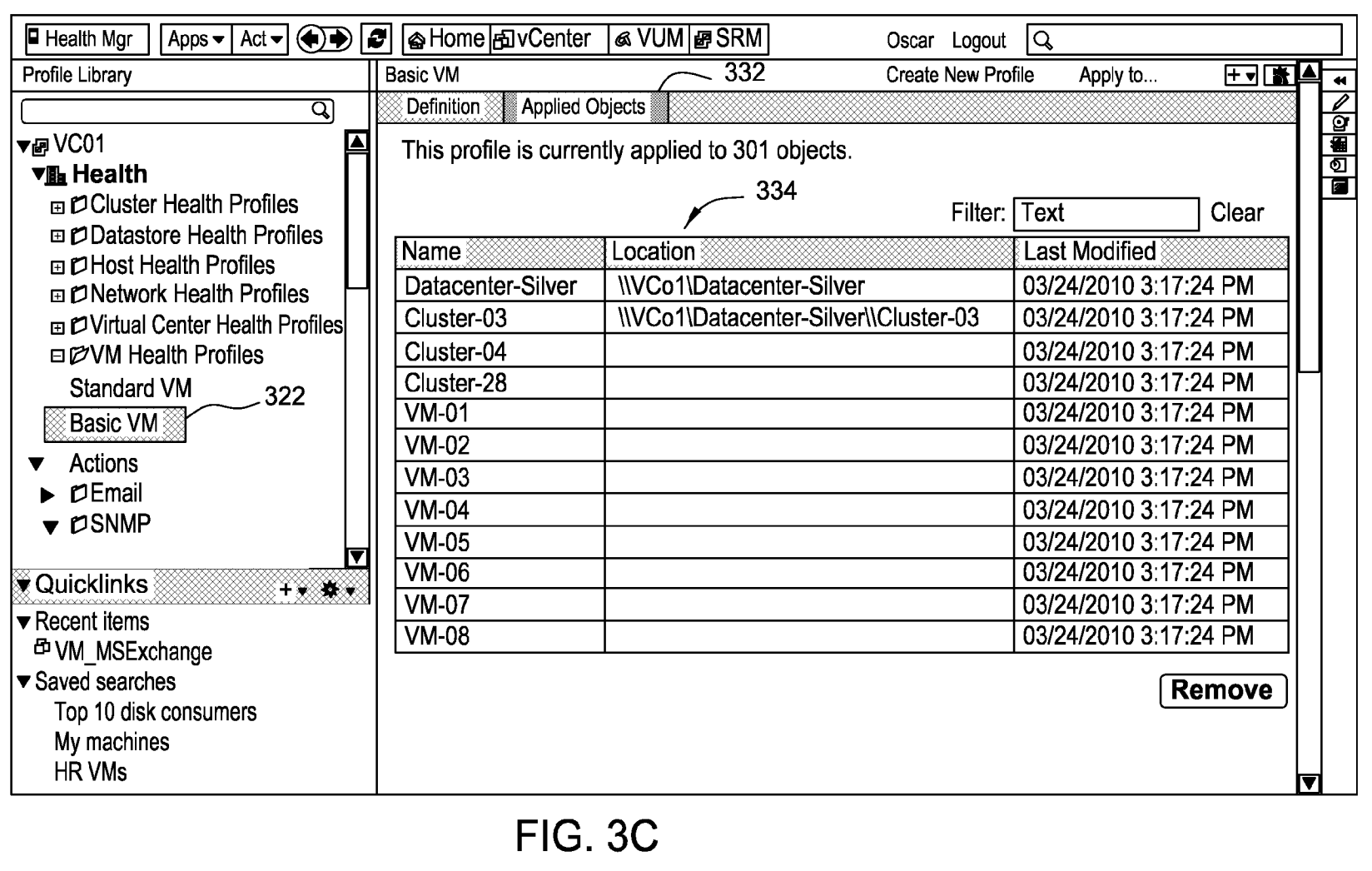

FIG. 3C depicts a screenshot of an applied objects portion 334 of a user interface for managing a monitoring profile, according to one embodiment of the invention. In one embodiment, the user can access the applied objects portion 334 by selecting an applied objects link 332 in the user interface. As shown, the applied objects portion 334 includes a listing of objects in the virtualized computing environment to which the selected monitoring profile 322 is applied.

In addition to having a monitoring profile applied directing to an object, the object could also inherit one or more additional monitoring profiles that are applied to other objects that are above the object in the hierarchical inventory tree of the virtualized computing environment. FIG. 4 depicts a screenshot of an inheritance hierarchy for monitoring profiles applied to objects in a virtualized computing environment, according to one embodiment of the invention. As shown, a virtual machine 402 is included in a virtualized computing environment organized in a hierarchy. A monitoring profile 404, i.e., a "Silver VM" monitoring profile, is applied to the virtual machine 402.

The virtual machine 402 is included in a folder 408 called "Production." A "Production VM" monitoring profile 410 is applied to the folder 408. The folder 408 is included in a host 412 called "Host 23." A "VMs on Host23" monitoring profile 414 is applied to the host 412. The host 412 is included in a virtual center 416 called "VC01." A "Standard VM" monitoring profile 418 is applied to the virtual center 416. In one embodiment, the user interface shown in FIG. 4 displays a condensed, or "effective," hierarchical tree of the virtual machine 402. Other objects may be included in the hierarchy, but to simplify the user interface, only the objects in the direct path from the virtual machine 402 to the virtual center 416 are shown.

According to some embodiments, there may be rules that conflict with one another in the various monitoring profiles in the hierarchy. Therefore, prioritization of the monitoring profiles determines which monitoring profile should be applied, thereby defining the effective rules. In one embodiment, the monitoring profile assigned directly at the object in question has the highest priority. If there are more monitoring profiles that are inherited from other objects in the hierarchy, then the closer the object to the original object, the higher the priority. In the example shown in FIG. 4, the monitoring profile 404 has the highest priority, followed by monitoring profile 410, monitoring profile 414, and monitoring profile 418. The priority is displayed in a priority column 420.

In some embodiments, an object can be included in two or more different hierarchies depending on the "view" of the virtualized computing environment. For example, one view of the virtualized computing environment, referred to as a "Hosts and Clusters view," organizes the objects in the virtualized computing environment according to the physical relationships of the various objects. FIG. 2 provides an example of a hierarchy of physical relationships that corresponds to a Hosts and Clusters view. Another view of the virtualized computing environment, referred to as a "VM Templates and Folders view," organizes the objects in the virtualized computing environment according to user-defined folders or other groupings. The hierarchy of a VM Templates and Folders view may not necessarily correspond to the physical relationships of the various objects. For the purpose of applying monitoring profiles, the various hierarchies are flattened into a single hierarchy. In some embodiments, the VM Folders & Templates hierarchy has a higher priority than the Hosts & Clusters hierarchy when applying monitoring profiles. In other embodiments, the Hosts & Clusters hierarchy has a higher priority than the VM Folders & Templates when applying monitoring profiles.

Figure 5A:
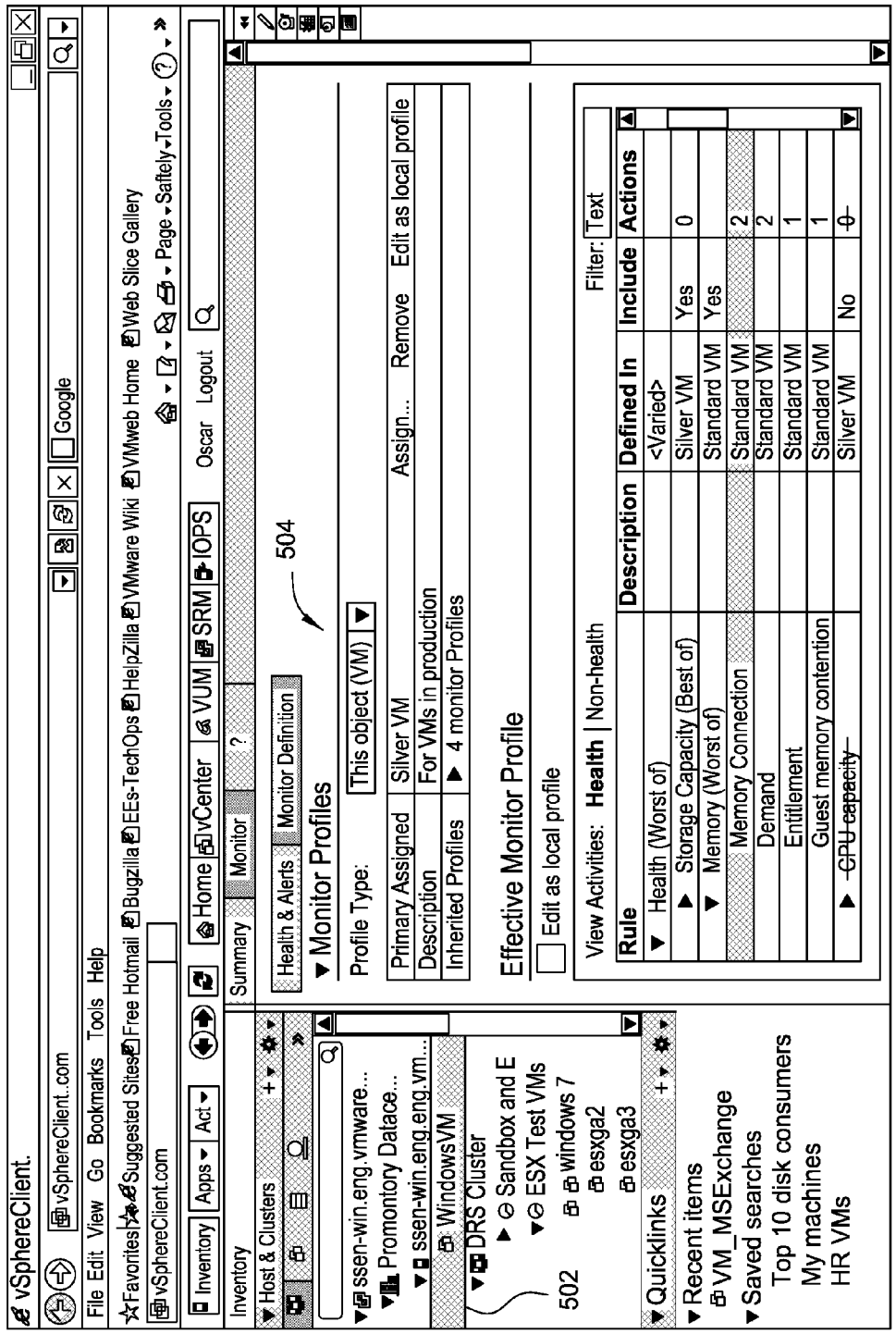
FIG. 5A depicts an effective profile that combines the monitoring profiles that an object is inheriting and a monitoring profile directly assigned to the object, according to one embodiment of the invention.

FIG. 5A depicts an effective profile that combines the monitoring profiles that an object is inheriting and a monitoring profile directly assigned to the object, according to one embodiment of the invention. In other words, the effective profile displays one comprehensive view of the various monitoring profiles applied to an object. The effective profile aids the user in understanding where the rules applied to a particular object are inherited from and how to edit the rules. In the example shown in FIG. 5A, the user has selected a virtual machine 502 from a Hosts and Clusters view of the virtualized computing environment. A details portion 504 of the effective profile is shown in the user interface.

FIG. 5B depicts the details portion 504 of the effective profile, according to one embodiment of the invention. As shown, in FIG. 5B, there are four monitoring profiles 506 being inherited by the virtual machine 502, and one primary profile monitoring profile 508, i.e., "Silver VM," assigned to the virtual machine 502. In a rules portion 510 of the details portion 504, rules are aggregated from the various monitoring profiles to form one aggregated listing of rules, where one column displays a specific rule and another column 512 displays which monitoring profile the rule in defined in or inherited from. In the example shown, "Storage Capacity" rules come from the "Silver VM" monitoring profile, and "Memory" rules come from the "Standard VM" monitoring profile. The monitoring profiles listed in column 512 can comprise hyperlinks that allow the user to navigate to another user interface to edit the particular rule.

Column 514 displays whether a rule is being INCLUDED or EXCLUDED. In some embodiments, some monitoring profiles may explicitly EXCLUDE a certain rule from being inherited. When the user clicks "No" to EXCLUDE a rule, the rule becomes striked -through so that the user can see that there the rule has been explicitly excluded from the effective profile.

Figure 6:
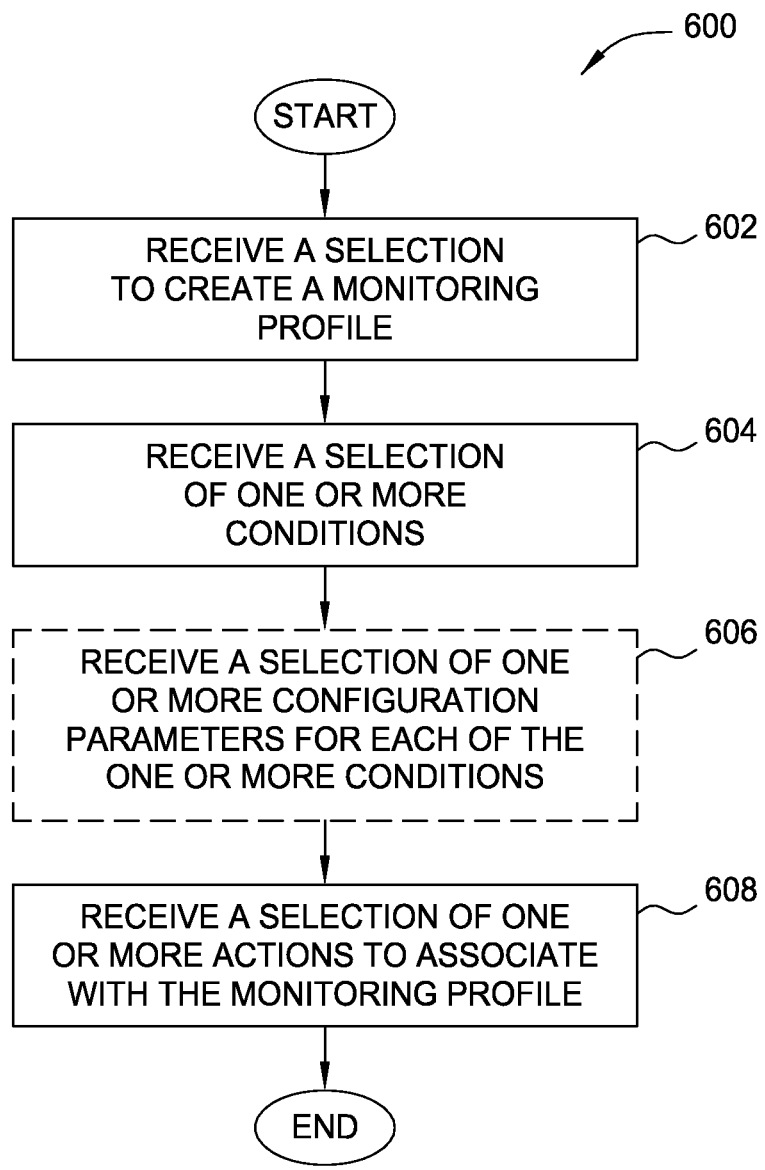
FIG. 6 is a flow diagram for defining a monitoring profile, according one embodiment of the invention.

FIG. 6 is a flow diagram for defining a monitoring profile, according one embodiment of the invention. Persons skilled in the art would understand that, even though the method 600 is described in conjunction with the systems of FIGS. 1-5B, any system configured to perform the method steps, in any order, is within the scope of embodiments of the invention.

As shown, the method 600 begins at step 602, where a processing unit, such as the processing unit that executes the VI client 106, receives a selection to create a monitoring profile. The selection may be made via a link to create a new monitoring profile in the user interface of the VI client 106.

FIGS. 7A-7G depict screenshots of user interfaces for defining a monitoring profile, according to embodiments of the invention. Upon receiving the selection to create the monitoring profile at step 602, the processor can cause the user interface shown in FIG. 7A to be displayed. The user interface allows the user to enter a Name and Description of the monitoring profile.

At step 604, the processor receives a selection of one or more conditions. The conditions define one or more metrics of the object that are monitored by the monitoring profile. FIG. 7B depicts a screenshot of a user interface for selecting one or more conditions, according to one embodiment of the invention. As shown, the conditions can be arranged by resource type, i.e., CPU, disk, memory, network, or system.

Figure 7A:
Figure 7B:
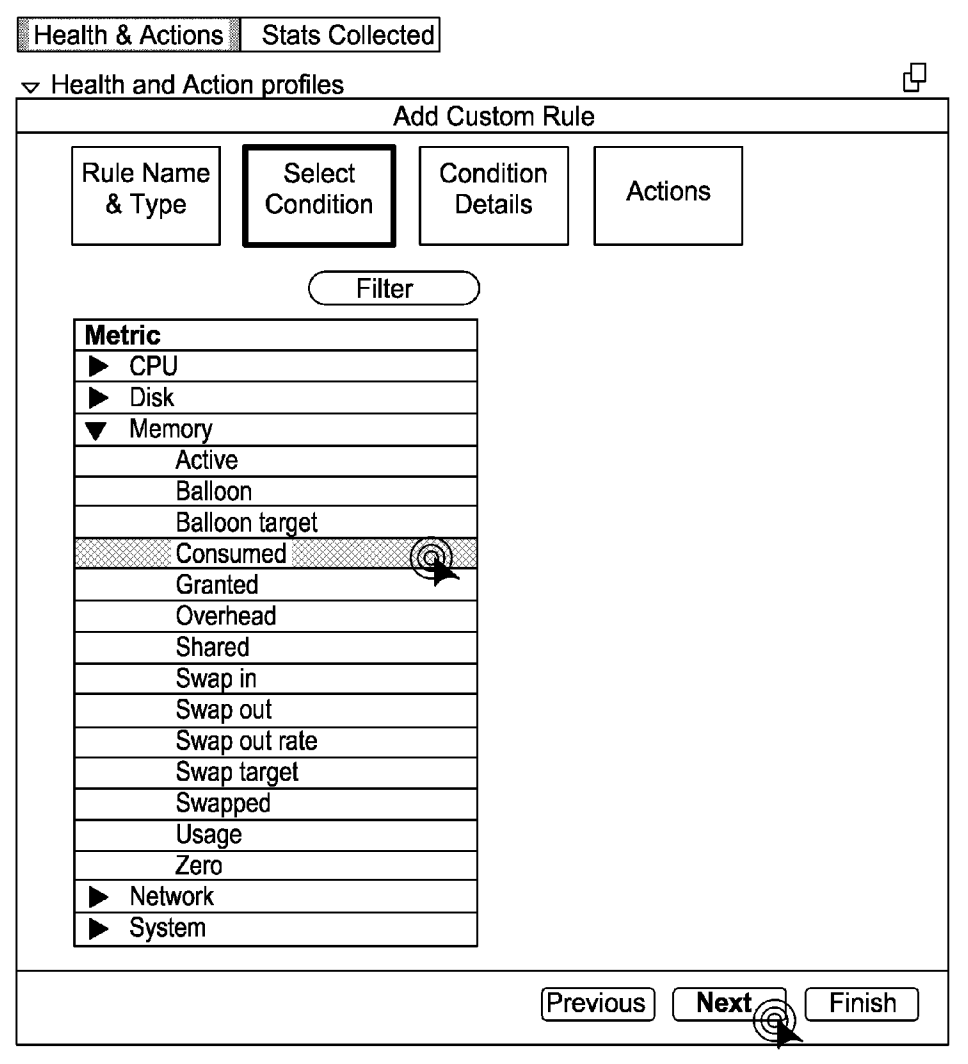
Figure 7C:
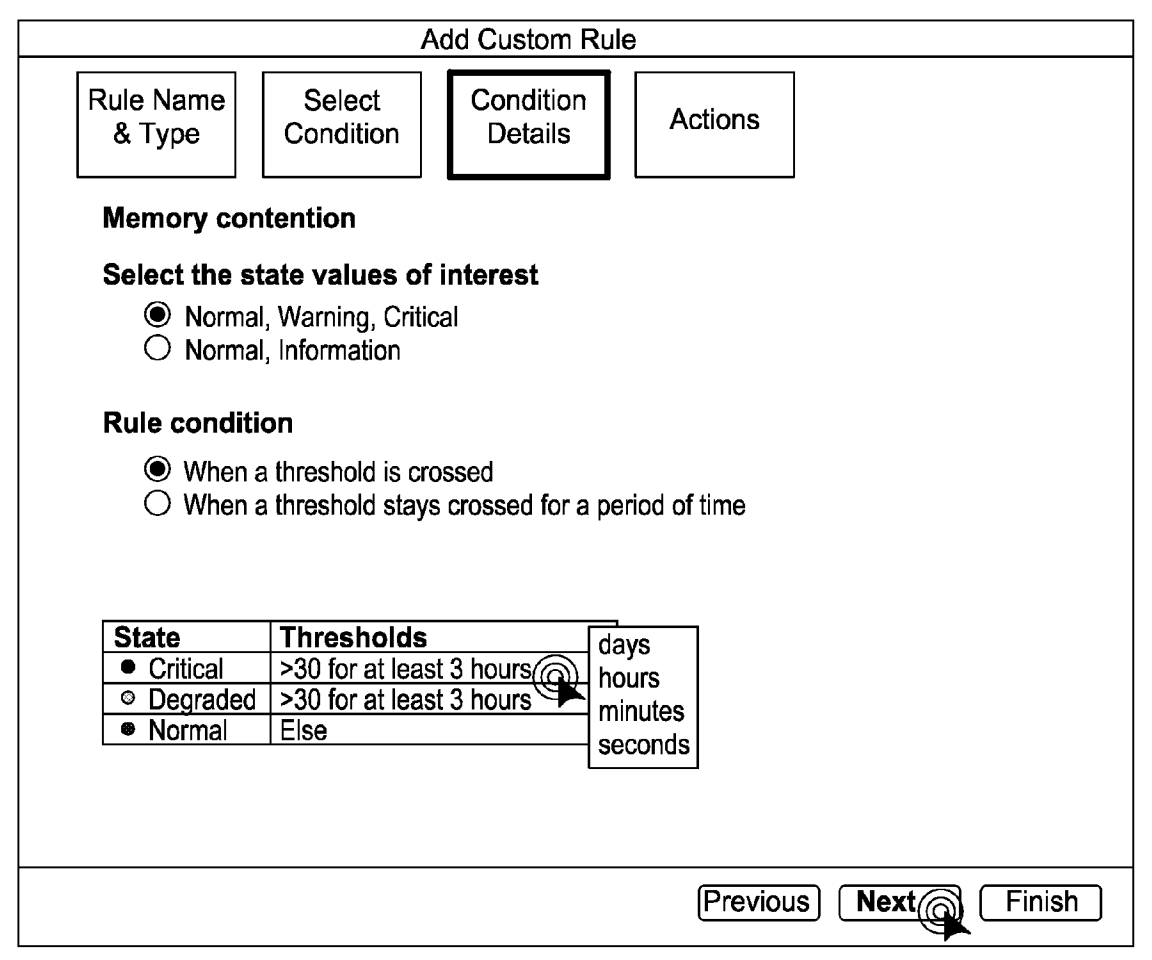
Figure 7D:

At step 606, the processor receives a selection of one or more configuration parameters for each of the one or more conditions. FIG. 7C depicts a screenshot of a user interface for selecting one or more configuration parameters for each of the one or more conditions, according to one embodiment of the invention. In the embodiment shown in FIG. 7B-7C, separate user interfaces are allow for the selection of the one or more conditions and the one or more configuration parameters, respectively. In another embodiment, the one or more conditions and the one or more configuration parameters are selected from a single user interface. FIG. 7D depicts a screenshot of a user interface for selecting the one or more conditions and the one or more configuration parameters from a single user interface, according to one embodiment of the invention. In some embodiments, step 606 is optional, depicted by the dotted lines in FIG. 6, and is omitted.

Figure 7F:
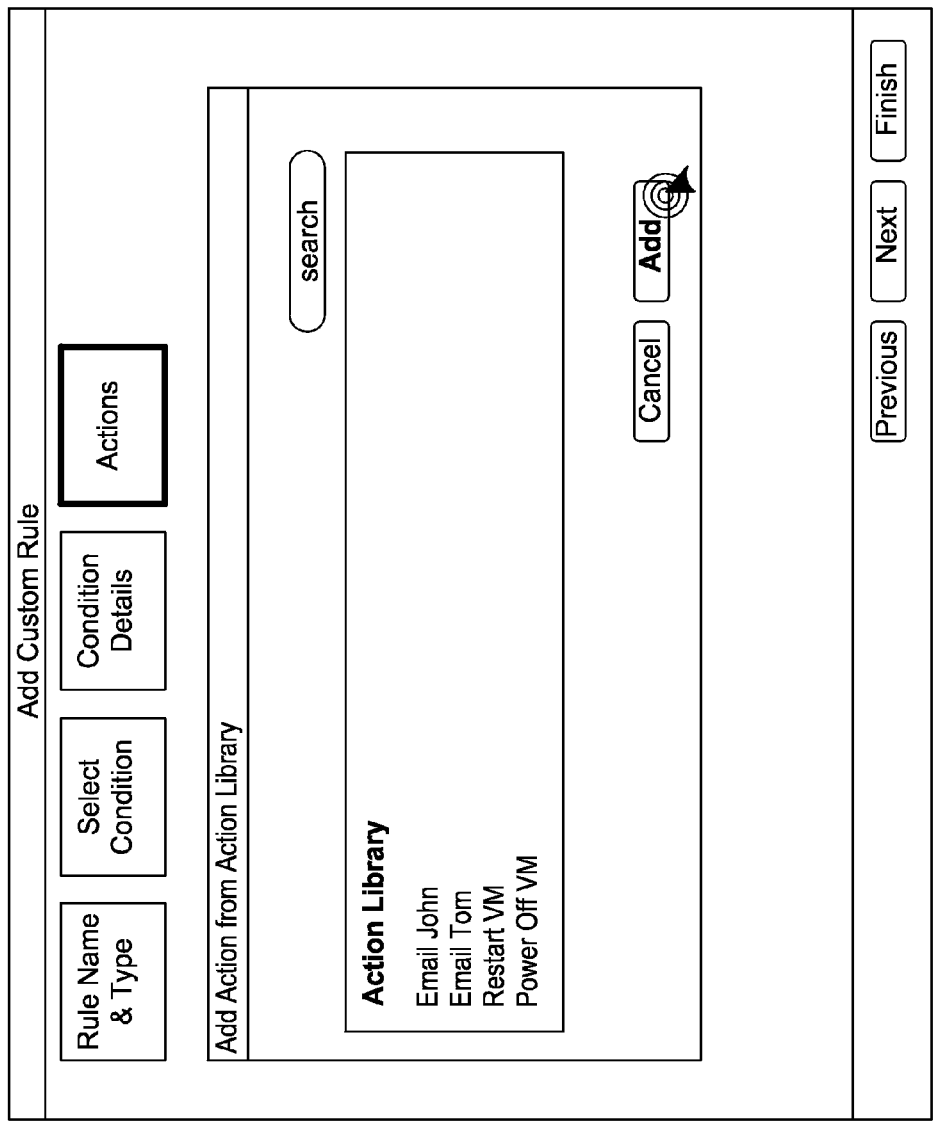

At step 608, the processor receives a selection of one or more actions to be associated with the monitoring profile. FIG. 7E depicts a screenshot of a user interface for selecting one or more actions to be associated with the monitoring profile, according to one embodiment of the invention. Examples of actions to be performed if a condition is violated include sending an email, issuing an SNMP trap 320, executing a script, executing a virtual architecture-specific action, such as migrating a virtual machine from one host to another or migrating a disk image of a virtual machine from one storage array to another, or performing any other action. As described above, the actions can be defined in an action library and selected from the action library to be associated with the monitoring profile. FIG. 7F depicts a screenshot of a user interface for selecting an action from an action library, according to one embodiment of the invention. Once the actions are selected, a comprehensive view of the monitoring profile can be displayed for the user to review. FIG. 7G depicts a screenshot of a user interface of a comprehensive view of a monitoring profile that includes one or more conditions, one or more associated configuration parameters, and one or more actions, according to one embodiment of the invention.

In sum, one or more embodiments of the invention provide for a monitoring profile that includes a collection of rules with expected values of performance or activity defined for an object in a virtualized computing environment. The rules can be associated with actions, alerts, or other operations that are performed if the rules are violated. The monitoring profile can be associated with one or more objects in the virtualized computing environment. Additionally, rules can be inherited from monitoring profiles of other objects in a hierarchy, and prioritization rules disambiguate between conflicts. A user can modify the rules or actions associated with a monitoring profile. By providing these features, a user interface according to one or more embodiments of the present invention allows the user to quickly and easily monitor the status of objects in the virtual computing environment. For example, the user only needs to change the monitoring profile a single time, and any objects in the virtualized computing environment to which the monitoring profile is applied are updated to be associated with the modified monitoring profile.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We Claim:

1. A method for displaying a graphical user interface for a virtualized computing environment including a plurality of host computers, each having one or more virtual machines running therein, wherein the virtualized computing environment is configured with one or more monitoring profiles for monitoring a status of objects included in the virtualized computing environment, the method comprising:

displaying a first section that comprises one or more monitoring profiles to be managed and selected for viewing, wherein each monitoring profile includes one or more rules and each rule corresponds to one or more actions that are performed if the rule is violated, wherein the one or more actions are identified in the first section as one or more unique numeric values that are selectable by a user, wherein each of the one or more actions is represented by a unique number, wherein the first section includes a hierarchically-arranged view of the one or more monitoring profiles, wherein the one or more monitoring profiles are organized into a folder for cluster health profiles, a folder for data center health profiles, a folder for host computer health profiles, a folder for network health profiles, a folder for virtual center health profiles and a folder for virtual machine health profiles that are presented at the same hierarchy level, and wherein displaying the first section comprises:

receiving a user selection to create a monitoring profile;

receiving a selection of one or more conditions that define one or more metrics of an object that are monitored by the monitoring profile;

receiving a selection of one or more configuration parameters for each of the one or more conditions; and receiving a selection of the one or more actions to be associated with the monitoring profile; and displaying a second section that comprises a first set of rules associated with a selected monitoring profile and corresponding actions associated with each rule in the first set of rules.

2. The method of claim 1, wherein a first monitoring profile is associated with one or more virtual machines in the virtualized computing environment.

3. The method of claim 2, wherein a first rule is included in the first monitoring profile, and a first action associated with the first rule is performed when the first rule is violated for any of the one or more virtual machines associated with the first monitoring profile.

4. The method of claim 1, wherein the one or more actions that are performed if a rule is violated include a plurality of actions, wherein the actions include sending an email, issuing an SNMP (Simple Network Management Protocol) trap, migrating a virtual machine from one host computer to another host computer, and migrating a disk image of a virtual machine from one storage array to another storage array.

5. The method of claim 1, wherein each rule is associated with a status of a resource associated with an object included in the virtualized computing environment.

6. The method of claim 5, wherein the resource comprises a processing resource, a disk resource, a memory resource, a network resource, or a system resource.

7. The method claim 1, further comprising displaying a third section for organizing one or more objects included in the virtualized computing environment to which the selected monitoring profile is applied.

8. The method of claim 1, wherein the second section includes a slider associated with a range of numeric resource values and corresponding actions that are performed if the numeric resource values are exceeded.

9. The method of claim 1, wherein the folder for virtual center health profiles contains information for monitoring a status of a virtual center, wherein the folder for data center health profiles contains information for monitoring a status of a plurality of data centers, wherein the folder for host computer health profiles contains information for monitoring a status of a plurality of host computers, wherein the folder for virtual machine health profiles contains information for monitoring a status of a pluralist of virtual machines, wherein the virtual center is at the root of a hierarchical organization of the virtualized computing environment, wherein the data centers are underneath the virtual center in the hierarchical organization, wherein the host computers are underneath the data centers in the hierarchical organization and wherein the virtual machines are underneath the host computers in the hierarchical organization.

10. A non-transitory computer-readable storage medium comprising instructions that, when executed in a computing device, causing the computing device to perform steps for displaying a graphical user interface to be displayed, wherein the graphical user interface is for a virtualized computing environment including a plurality of host computers, each having one or more virtual machines running therein, wherein the virtualized computing environment is configured with one or more monitoring profiles for monitoring a status of objects included in the virtualized computing environment, the steps comprising:

displaying a first section that comprises one or more monitoring profiles to be managed and selected for viewing, wherein each monitoring profile includes one or more rules and each rule corresponds to one or more actions that are performed if the rule is violated, wherein the one or more actions are identified in the first section as one or more unique numeric values that are selectable by a user of the computing device, wherein each of the one or more actions is represented by a unique number, wherein the first section includes a hierarchically-arranged view of the one or more monitoring profiles, and wherein the one or more monitoring profiles are organized into a folder for cluster health profiles, a folder for data center health profiles, a folder for host computer health profiles, a folder for network health profiles, a folder for virtual center health profiles and a folder for virtual machine health profiles that are presented at the same hierarchy level, and wherein displaying the first section comprises:

receiving a user selection to create a monitoring profile;

receiving a selection of one or more conditions that define one or more metrics of an object that are monitored by the monitoring profile;

receiving a selection of one or more configuration parameters for each of the one or more conditions; and receiving a selection of the one or more actions to be associated with the monitoring profile; and displaying a second section that comprises a first set of rules associated with a selected monitoring profile and displays corresponding actions associated with each rule in the first set of rules.

11. The computer-readable storage medium of claim 10, wherein a first monitoring profile is associated with one or more virtual machines in the virtualized computing environment.

12. The computer-readable storage medium of claim 11, wherein a first rule is included in the first monitoring profile, and a first action associated with the first rule is performed when the modified first rule is violated for any of the one or more virtual machines associated with the first monitoring profile.

13. The computer-readable storage medium of claim 10, wherein the one or more actions that are performed if a rule is violated include a plurality of actions, wherein the actions include sending an email, issuing an SNMP (Simple Network Management Protocol) trap, migrating a virtual machine from one host computer to another host computer, and migrating a disk image of a virtual machine from one storage array to another storage array.

14. The computer-readable storage medium of claim 10, wherein each rule is associated with a status of a resource associated with an object included in the virtualized computing environment.

15. The computer-readable storage medium of claim 10, wherein the steps further comprising displaying a third section for organizing one or more objects included in the virtualized computing environment to which the selected monitoring profile is applied.

16. The computer-readable storage medium of claim 10, wherein the second section includes a slider associated with a range of numeric resource values and corresponding actions that are performed if the numeric resource values are exceeded.

17. A method for displaying a graphical user interface for a virtualized computing environment including a plurality of host computers, each having one or more virtual machines running therein, wherein the virtualized computing environment is configured with one or more monitoring profiles for monitoring a status of objects included in the virtualized computing environment, the method comprising:

displaying a first section that comprises a condensed hierarchy of a first virtual machine in the virtualized computing environment, wherein a first monitoring profile is associated with the first virtual machine and at least one additional monitoring profile is associated with at least one object included in the condensed hierarchy above the first virtual machine, wherein each monitoring profile includes one or more rules and each rule corresponds to an action that is performed if the rule is violated, wherein the action is identified in the first section as a unique numeric value that is selectable by a user, wherein the action is represented by a unique number, wherein the first section includes a hierarchically-arranged view of the one or more monitoring profiles, and wherein the one or more monitoring profiles are organized into a folder for cluster health profiles, a folder for data center health profiles, a folder for host computer health profiles, a folder for network health profiles, a folder for virtual center health profiles and a folder for virtual machine health profiles that are presented at the same hierarchy level, and wherein displaying the first section comprises:
receiving a user selection to create a monitoring profile;
receiving a selection of one or more conditions that define one or more metrics of an object that are monitored by the monitoring profile;
receiving a selection of one or more configuration parameters for each of the one or more conditions; and
receiving a selection of the one or more actions to be associated with the monitoring profile; and displaying a second section that comprises a relative priority of the first monitoring profile and each of the additional monitoring profiles.

18. The method of claim 17, wherein a rule included in the first monitoring profile has priority over a conflicting rule in one of the additional monitoring profiles.

19. The method of claim 17, wherein a first rule included in one of the additional monitoring profiles has priority over a second rule included in another one of the additional monitoring profiles that conflicts with the first rule.

20. The method of claim 19, wherein the first rule is included in a second monitoring profile and the second rule is included in a third monitoring profile, wherein the second monitoring profile is applied to an object that is closer to the first virtual machine in the effective hierarchy than an object to which the third monitoring profile is applied.

* * * * *